(12) United States Patent
Gagne

(10) Patent No.: US 12,129,088 B2
(45) Date of Patent: Oct. 29, 2024

(54) POLYMERIC WRAPPER

(71) Applicant: Sonoco Development Inc., Hartsville, SC (US)

(72) Inventor: Joseph D. Gagne, Holyoke, MA (US)

(73) Assignee: Sonoco Development, Inc., Hartsville, SC (US)

( * ) Notice: Subject to any disclaimer, the term of this patent is extended or adjusted under 35 U.S.C. 154(b) by 33 days.

(21) Appl. No.: 17/981,020

(22) Filed: Nov. 4, 2022

(65) Prior Publication Data
US 2023/0125926 A1  Apr. 27, 2023

Related U.S. Application Data

(62) Division of application No. 16/996,169, filed on Aug. 18, 2020, now abandoned.
(Continued)

(51) Int. Cl.
*B65D 65/02* (2006.01)
*B32B 7/02* (2019.01)
(Continued)

(52) U.S. Cl.
CPC ............. *B65D 65/02* (2013.01); *B32B 7/02* (2013.01); *B32B 27/08* (2013.01); *B32B 27/306* (2013.01);
(Continued)

(58) Field of Classification Search
CPC ......... B32B 27/32; B32B 7/02; B32B 27/08; B32B 27/30; B32B 7/12; B32B 27/325;
(Continued)

(56) References Cited

U.S. PATENT DOCUMENTS

| | | |
|---|---|---|
| 4,008,115 A | 2/1977 | Fairbanks et al. |
| 4,595,620 A | 6/1986 | Dighton |
| | (Continued) | |

FOREIGN PATENT DOCUMENTS

| | | |
|---|---|---|
| CN | 102765236 | 11/2012 |
| EP | 0339670 A2 | 4/1989 |
| | (Continued) | |

OTHER PUBLICATIONS

International Search Report and Written Opinion of Application No. PCT/US2020/046766 , Dated Oct. 20, 2020; 13 pages.

*Primary Examiner* — Monica A Huson
*Assistant Examiner* — Kelsey C Grace
(74) *Attorney, Agent, or Firm* — Nelson Mullins Riley & Scarborough LLP

(57) ABSTRACT

In an embodiment, the invention comprises a wrapper with dead bend characteristics. The wrapper comprises a first polyethylene layer comprising low density polyethylene; a second polyethylene layer affixed to the first layer, wherein the second polyethylene layer comprises high density polyethylene; a first tie layer affixed to the second layer, opposite the first layer; a barrier layer affixed to the tie layer, opposite the second layer; a second tie layer affixed to the barrier layer, opposite the first tie layer; a third polyethylene layer affixed to the second tie layer, opposite the barrier layer, wherein the third polyethylene layer comprises high density polyethylene; and a fourth polyethylene layer affixed to the third polyethylene layer, opposite the second tie layer, wherein the fourth polyethylene layer comprises low density polyethylene. In an embodiment, the tie layers and the barrier layer may be substituted with a cyclic olefin copolymer layer.

24 Claims, 3 Drawing Sheets

Related U.S. Application Data

(60) Provisional application No. 62/890,798, filed on Aug. 23, 2019.

(51) Int. Cl.
| | | |
|---|---|---|
| *B32B 27/08* | (2006.01) | |
| *B32B 27/30* | (2006.01) | |
| *B32B 27/32* | (2006.01) | |

(52) U.S. Cl.
CPC .......... *B32B 27/32* (2013.01); *B32B 2250/05* (2013.01); *B32B 2250/246* (2013.01); *B32B 2307/72* (2013.01); *B32B 2439/70* (2013.01)

(58) Field of Classification Search
CPC .............. B32B 27/306; B32B 2250/24; B32B 2270/00; B32B 2439/70; B32B 2307/7242; B32B 2307/732; B32B 2307/72; B32B 2272/00; B32B 2307/7244; B32B 2250/246; B32B 2250/40; B32B 2250/05; B32B 2553/00; B32B 2307/5825; B65D 65/02
See application file for complete search history.

(56) References Cited

U.S. PATENT DOCUMENTS

| | | | |
|---|---|---|---|
| 4,806,398 A | 2/1989 | Martin, Jr. | |
| 4,810,745 A | 3/1989 | Pike et al. | |
| 4,882,230 A | 11/1989 | Warner | |
| 4,965,135 A * | 10/1990 | Im | B32B 27/304 |
| | | | 156/244.11 |
| 5,792,549 A | 8/1998 | Wilkie | |
| 5,888,649 A | 3/1999 | Curatolo et al. | |
| 5,919,547 A | 7/1999 | Kocher et al. | |
| 5,985,388 A | 11/1999 | Tomita et al. | |
| 6,337,113 B1 | 1/2002 | Muggli et al. | |
| 6,528,127 B1 | 3/2003 | Edlein et al. | |
| 6,777,050 B1 | 8/2004 | Engelaere | |
| 6,926,951 B2 | 8/2005 | Huffer | |
| 7,279,205 B2 | 10/2007 | Huffer et al. | |
| 7,794,848 B2 * | 9/2010 | Breese | B32B 27/30 |
| | | | 428/515 |
| 8,079,470 B2 | 12/2011 | Trajkovich | |
| 8,444,902 B2 | 5/2013 | Middleton et al. | |
| 8,541,081 B1 | 9/2013 | Ranganathan et al. | |
| 8,932,725 B2 | 1/2015 | Keohn et al. | |
| 9,340,351 B2 | 5/2016 | Conlon et al. | |
| 9,573,348 B2 | 2/2017 | Sakellarides | |
| 9,656,447 B2 | 5/2017 | Sakellarides | |
| 9,676,169 B2 | 6/2017 | Paulino | |
| 9,944,446 B2 | 4/2018 | Huffer et al. | |
| 2008/0099540 A1 | 5/2008 | Mueller et al. | |
| 2011/0300391 A1 | 12/2011 | Haley | |
| 2012/0141642 A1 | 6/2012 | Kubik et al. | |
| 2017/0334175 A1 | 11/2017 | Lawrence et al. | |
| 2018/0346222 A1 | 12/2018 | Brumbaugh et al. | |
| 2019/0001636 A1 | 1/2019 | Kupsch et al. | |

FOREIGN PATENT DOCUMENTS

| | | |
|---|---|---|
| EP | 0671887 A1 | 6/1994 |
| EP | 0870695 A1 | 10/1998 |
| EP | 2796289 A1 | 10/2014 |
| GB | 2156362 A | 10/1985 |
| GB | 2298818 A | 9/1996 |
| JP | H02117826 A | 5/1990 |
| JP | H6341097 | 12/1994 |
| JP | H07186514 A | 7/1995 |
| JP | 2000238196 | 9/2000 |
| JP | 2000297218 | 10/2000 |
| WO | 9413151 A1 | 6/1994 |
| WO | 95/09876 | 4/1995 |
| WO | 96/29205 A1 | 9/1996 |
| WO | 9964500 A1 | 12/1999 |
| WO | 00/35671 A1 | 6/2000 |
| WO | 0053429 A1 | 9/2000 |
| WO | 0194451 A2 | 12/2001 |
| WO | 2010075242 A1 | 7/2010 |
| WO | 2013068809 A1 | 5/2013 |
| WO | 2017106120 A2 | 6/2017 |
| WO | 2018118441 A1 | 6/2018 |

* cited by examiner

POLYMERIC WRAPPER

CROSS-REFERENCE TO RELATED APPLICATIONS

This application is a divisional of U.S. patent application Ser. No. 16/996,169 filed on Aug. 18, 2020, entitled "Polymeric Wrapper", which claims priority to U.S. Provisional Patent Application No. 62/890,798, filed Aug. 23, 2019, entitled "Polymeric Wrapper", each of which are incorporated herein in their entirety by reference.

FIELD OF THE INVENTION

The present invention relates generally to polymeric wrappers and more particularly to polymeric wrappers for candy and gum.

BACKGROUND OF THE INVENTION

Typical candy and/or gum wrappers are manufactured as laminated composite structures comprising, for example, a paper layer, a polymeric layer, a foil layer, and, optionally, another polymeric layer. The composite nature of the layers may provide a barrier against moisture and condensation, retaining the aroma and flavor of the wrapped product, may allow the display of certain brand or product information, and/or may provide a foldable quality (referred to herein as dead bend or dead fold) to the wrapper.

Wrapping structures such as these, however, are not recyclable due to the composite nature of the wrapper. Through hard work and ingenuity, the inventor has developed an inventive film, sheet, and wrapper structure which is fully recyclable in a single stream recycling process. Further, the inventive film, sheet, and wrapper structure maintains key performance characteristics of composite wrappers, such as lack of curl, tear resistance, dead fold characteristics, barrier qualities, and seal performance.

SUMMARY OF THE INVENTION

According to an aspect, the present invention provides a structure for a polymeric film, sheet, or wrapper. The inventive film may be a continuous film, disposed on a roll, for example. The inventive sheet may comprise an individual cut sheet of the inventive film, designed to be folded and sealed. The inventive wrapper may comprise a folded and sealed wrapper for candy, cough drops, throat lozenges, gum, or similar products. Though these types of products are contemplated herein, any product known in the art which would benefit from the advantages of the invention (lack of curl, tear resistance, dead fold characteristics, barrier qualities, seal performance) may be wrapped and packaged with the inventive product.

In an embodiment, the inventive composition comprises at least two layers of low density polyethylene (LDPE). Between the layers of LDPE, at least two layers of high density polyethylene (HDPE) may be sandwiched. Between the two layers of HDPE, a layer of either cyclic olefin copolymer (COC) or ethylene vinyl alcohol (EVOH) may be sandwiched. In the EVOH embodiment, tie layers may be utilized between the EVOH and the HDPE layers. In certain embodiments, the exterior LDPE layer may be coated with printed inks, over-lacquers, and/or sealant layers. The sealant may be pattern-applied to various seal regions of the wrapper.

In an embodiment, the invention provides a wrapper comprising: a first polyethylene layer comprising low density polyethylene; a second polyethylene layer affixed to the first layer, wherein the second polyethylene layer comprises high density polyethylene; a first tie layer affixed to the second layer, opposite the first layer; a barrier layer affixed to the tie layer, opposite the second layer; a second tie layer affixed to the barrier layer, opposite the first tie layer; a third polyethylene layer affixed to the second tie layer, opposite the barrier layer, wherein the third polyethylene layer comprises high density polyethylene; and a fourth polyethylene layer affixed to the third polyethylene layer, opposite the second tie layer, wherein the fourth polyethylene layer comprises low density polyethylene; wherein the wrapper has dead bend characteristics.

The wrapper may be twisted about five hundred and forty degrees and, if so, the twisted wrapper substantially retains its twisted state. After the wrapper is opened, it is reclosed by folding or twisting the wrapper and the wrapper substantially retains the fold or twist configuration. The first polyethylene layer may comprise the outer layer of the wrapper. The fourth polyethylene layer may comprise the inner, food contact layer of the wrapper. The barrier layer may comprise ethylene vinyl alcohol and the first tie layer and the second tie layer may each comprise maleic anhydride or a blend of maleic anhydride and polyethylene. The wrapper may not contain foil or paper and may not require the use of a seal or adhesive to close or reclose the wrapper.

In another embodiment, the wrapper may comprise a first polyethylene layer comprising low density polyethylene; a second polyethylene layer affixed to the first layer, wherein the second polyethylene layer comprises high density polyethylene; a cyclic olefin copolymer layer affixed to the second layer, opposite the first layer; a third polyethylene layer affixed to the cyclic olefin copolymer layer, opposite the second polyethylene layer, wherein the third polyethylene layer comprises high density polyethylene; and a fourth polyethylene layer affixed to the third polyethylene layer, opposite the second tie layer, wherein the fourth polyethylene layer comprises low density polyethylene; wherein the wrapper has dead bend characteristics. The cyclic olefin copolymer layer may comprise a barrier layer.

In an embodiment, the invention comprises a method for making a wrapper having dead bend characteristics comprising co-extruding a first polyethylene layer comprising low density polyethylene; a second polyethylene layer affixed to the first layer, wherein the second polyethylene layer comprises high density polyethylene; a first tie layer affixed to the second layer, opposite the first layer; a barrier layer affixed to the tie layer, opposite the second layer; a second tie layer affixed to the barrier layer, opposite the first tie layer; a third polyethylene layer affixed to the second tie layer, opposite the barrier layer, wherein the third polyethylene layer comprises high density polyethylene; and a fourth polyethylene layer affixed to the third polyethylene layer, opposite the second tie layer, wherein the fourth polyethylene layer comprises low density polyethylene; wherein the wrapper has dead bend characteristics. The method may further comprise twisting the wrapper about five hundred and forty degrees. The method may not include the use of a seal or adhesive to close the wrapper.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary

Figure 1:
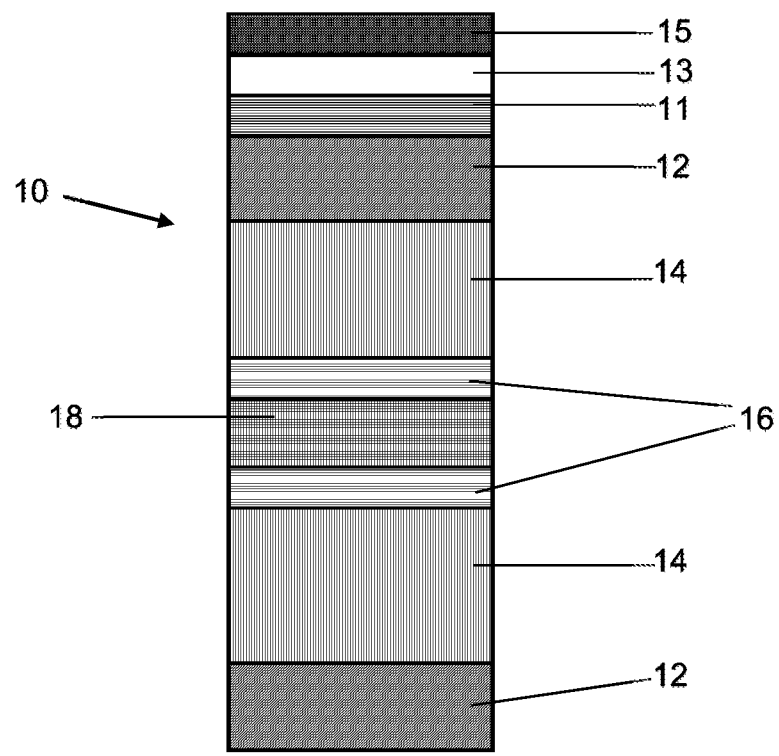
FIG. 1 is cross-sectional view of an embodiment of a film, sheet, or wrapper of the present invention.

Repeated use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Composite wrappers which comprise paper and/or foil layers often remain in a closed condition due to the fact that paper and foil each possess certain dead bend (also referred to as "dead fold") characteristics. As used herein, the term "dead bend" refers to the ability of a material to remain in a deformed state (or substantially deformed state) or to hold its new conformation (or substantially hold its new conformation) on shaping, whether that comprises a fold, twist, or other shaping method. Generally speaking, polymeric films typically do not have sufficient dead bend characteristics for these types of applications. Rather, polymeric films and plastics have a tendency to spring back or recover to an unfolded state. Surprisingly, however, the inventive polymeric composition has the ability to be dead-folded, that is, to remain in (or substantially remain in) a folded position after folding, creasing, and/or twisting.

In an embodiment, the inventive composition comprises a film, sheet, or wrapper. The inventive composition, according to an embodiment of the invention, may be laminated or co-extruded. The inventive composition, according to an embodiment, may be coated, tinted, untreated, one-side treated, two-side treated, and/or metallized. The inventive composition may be sealable to itself. The inventive composition can be cold-sealed or heat-sealed. The inventive composition can also be adhered or laminated to other materials, in an embodiment, such as polymers (polypropylene, polyethylene or polyester films, for example), foil, paper, foam and other materials known in the art. In a particular embodiment, however, the inventive film is used without a paper, foil, or other composite layer or laminate. This allows recyclability of the inventive film, sheet, or wrapper in a single stream recycling process.

In an embodiment, the films, sheets, and wrappers of the present invention may be utilized for packaging in general and for packaging small items in particular. For example, the inventive films, sheets and wrappers may be utilized to package individual pieces of candy, gum, confections, cough drops, throat lozenges, or the like. In another embodiment, the inventive films, sheets and wrappers may be utilized to package a plurality of pieces of candy, gum, confections, cough drops, throat lozenges, or the like, each of which may, or may not, be individually wrapped. For example, Starburst® candies are each individually wrapped and a plurality of individually wrapped Starburst® candies are also contained in a wrapper. The present invention could be utilized to wrap each individual Starburst® candy and/or to wrap and package a plurality of Starburst® candies, such as in a roll or stack.

In an embodiment, the thickness of the inventive film, sheet, or wrapper may be from about 2 to about 4 mils thick. In another embodiment, the thickness of the inventive film, sheet, or wrapper may be about 3 mils thick. In an embodiment, the inventive film or sheet is flat and curl-free.

In an embodiment, the inventive film, sheet, or wrapper comprises a plurality of layers. As shown in FIG. 1, in a first embodiment, the inventive sheet 10 may comprise a first layer 12. The first layer 12 may comprise the external layer of the sheet 10 (i.e. disposed furthest from the food product) or may be disposed external of the contents to be contained therein, but may be coated externally, discussed below. In an embodiment, the first layer 12 may comprise low density polyethylene (LDPE). The first layer 12 may be referred to herein as the first LDPE layer 12 and/or the skin layer 12. The first layer 12 may have an outer surface and an inner surface.

In an embodiment, the inner surface of the first layer 12 is laminated to, adhered to or is co-extruded with a second layer 14. In a particular embodiment, the first layer 12 is co-extruded with the second layer 14. In an embodiment, the second layer 14 comprises high density polyethylene (HDPE). The second layer 14 may also be referred to herein as the first HDPE layer 14. In an embodiment, the thickness of the second layer 14 is greater than the thickness of the first layer 12. In an embodiment, the second layer 14 has an inner surface and an outer surface (referring to proximity to the food product). In this embodiment, the inner surface of the first layer 12 may be adjacent and affixed to the outer surface of the second layer 14.

In an embodiment, the inner surface of the second layer 14 is adjacent a first tie layer 16. The tie layer 16 may be any tie layer known in the art. In a particular embodiment, the first layer 12 and the second layer 14 are co-extruded with the first tie layer 16. In an embodiment, the tie layer 16 has an inner surface and an outer surface.

In an embodiment, the inner surface of the first tie layer 16 is disposed adjacent an ethylene vinyl alcohol (EVOH) layer 18. In an embodiment, the EVOH layer 18 comprises a barrier layer for the film, sheet, or wrapper 10. In an embodiment, the EVOH layer 18 is a flexible, clear, glossy thermoplastic copolymer. In an embodiment, the EVOH layer 18 provides flex-crack resistance and exhibits a high resistance to hydrocarbons, oils and organic solvents. In a particular embodiment, the first layer 12 and the second layer 14 are co-extruded with the first tie layer 16 and the EVOH layer. In an embodiment, the EVOH layer 18 has an inner surface and an outer surface.

In an embodiment, the inner surface of the EVOH layer 18 is adjacent a second tie layer 16. The second tie layer 16 may be any tie layer known in the art and may be the same as or different from the first tie layer 16. In an embodiment, the first and second tie layers 16 may each comprise maleic anhydride. In another embodiment, the first and second tie layers 16 may each comprise a maleic anhydride blend with polyethylene. In a particular embodiment, the first layer 12, the second layer 14, the first and second tie layers 16, and the EVOH layer 18 are co-extruded. In an embodiment, the second tie layer 16 has an inner surface and an outer surface.

In an embodiment, the inner surface of the second tie layer 16 is disposed adjacent a second HDPE layer 14. In an embodiment, the second HDPE layer 14 has an inner surface and an outer surface. In this embodiment, the inner surface of the second tie layer 16 may be adjacent the outer surface of the second HDPE layer 14. In a particular embodiment, the first LDPE layer 12, the first HDPE layer 14, the first and second tie layers 16, the EVOH layer 18, and the second HDPE layer 14 are co-extruded.

In an embodiment, the inner surface of the second HDPE layer 14 is disposed adjacent a second LDPE layer 12. In an embodiment, the second LDPE layer 12 has an inner surface and an outer surface. In this embodiment, the inner surface of the second HDPE layer 14 may be adjacent the outer surface of the second LDPE layer 12. In an embodiment, the second LDPE layer 12 may comprise the interior of the film, sheet, or wrapper. In an embodiment, the second LDPE layer 12 may be a food-contact layer. In a particular embodiment, the first LDPE layer 12, the first HDPE layer 14, the first and second tie layers 16, the EVOH layer 18, the second HDPE layer 14, and the second LDPE layer 12 are co-extruded.

Thus, in an embodiment, the second LDPE layer 12 may comprise the interior of the film, sheet, or wrapper and the first LDPE layer 12 may comprise the exterior of the film, sheet, or wrapper. In another embodiment, one or more layers and/or coatings may be disposed exterior of the first LDPE layer 12. In this embodiment, an ink layer 11 may be disposed exterior of the first LDPE layer 12. The ink layer 11 may be printed onto the first LDPE layer 12, in an embodiment. The ink layer 11 may provide color schemes, product information, advertising, logos, etc. Any method of printing, including offset lithography, flexography, screen-printing, digital and gravure, may be utilized herein. After application of the ink layer 11, the film may be run through a drying unit to dry the ink layer 11. In an embodiment, an over-lacquer 13 may be disposed exterior to the ink layer 11.

In an embodiment, a sealant coating 15 may be disposed adjacent the first LDPE layer 12 or the ink layer 11/over-lacquer 13 if they are present. The sealant coating 15 may be pattern-applied in an embodiment. In an embodiment, the sealant coating 15 is surface-printed. In this embodiment, the sealant coating 15 may be applied only within the heat-seal regions of the film, sheet or wrapper. In an embodiment, the sealant coating 15 may comprise various sealant materials such as heat seals or cold seals. Heat seals generally are preferred because they provide stronger seals than cold seals typically are capable of achieving. In this embodiment, any suitable heat seal materials can be employed. In an embodiment, the sealant coating 15 may be applied along at least one longitudinal edge of the film sheet to form a lap or fin seal. In an embodiment, the sealant coating 15 may be additionally applied to opposite ends of the film sheet, perpendicular the longitudinal end, to form end seals. In an embodiment, the end seals comprise tuck and fold corners and/or ends.

In an embodiment, the invention comprises a gum packaging laminate comprising, in order, an LDPE layer, a HDPE layer, a tie layer, an EVOH layer, a tie layer, an HDPE layer, and an LDPE layer. In an embodiment, the exterior LDPE layer is coated with one or more of an ink, an over-lacquer, and a sealant.

Figure 2:
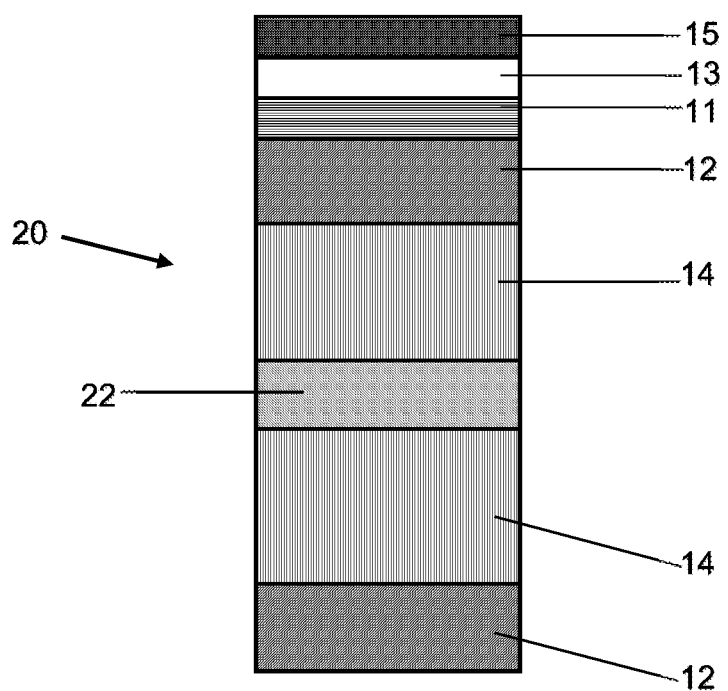
FIG. 2 is cross-sectional view of an alternate embodiment of a film, sheet, or wrapper of the present invention.

In another embodiment, illustrated in FIG. 2, a layer of cyclic olefin copolymer (COC) 22 may replace the first and second tie layers 16 and the EVOH layer 18 in the inventive film, sheet, or wrapper 20. The COC layer may provide barrier and dead fold characteristics to the film, sheet or wrapper 20. In this embodiment, the first LDPE layer 12, the first HDPE layer 14, the COC layer 22, the second HDPE layer 14, and the second LDPE layer 12 may be co-extruded. The ink layer 11, over-lacquer 13, and/or seal layer 15 may be present in this embodiment of the film, sheet, or wrapper 20.

While EVOH and COC are discussed herein as barrier layers, it should be understood that any barrier material known in the art may be utilized herein.

As discussed herein, the extrusion process used to form the film may comprise a blown film extrusion process or a cast extrusion process, as each are known in the art. Generally speaking, the blown film extrusion process may involve co-extruding the various molten polymers and layers discussed herein through a die and inflating to several times its initial diameter to form a thin film bubble. This bubble is then collapsed and used as a lay-flat film.

In an embodiment, the barrier layer (COC layer 22 or EVOH layer 18) may comprise between about 5% and about 15% of the total thickness of the film, sheet, or wrapper. In an embodiment, the tie layers 16 (if present) may comprise between about 5% and about 15% of the total thickness of the film, sheet, or wrapper. In an embodiment, the HDPE layers 14 may comprise between about 40% and about 70% of the total thickness of the film, sheet, or wrapper. In an embodiment, the LDPE layers 12 may comprise between about 5% and about 15% of the total thickness of the film, sheet, or wrapper.

Figure 3A:
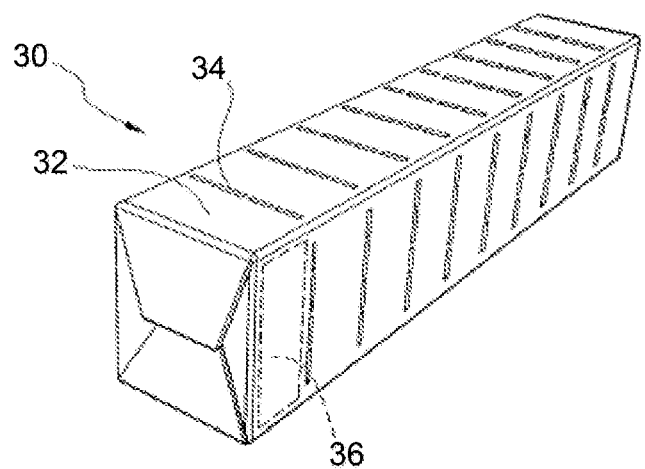
FIGS. 3A and 3B are perspective views of a wrapper in an embodiment of the invention.
Figure 3B:
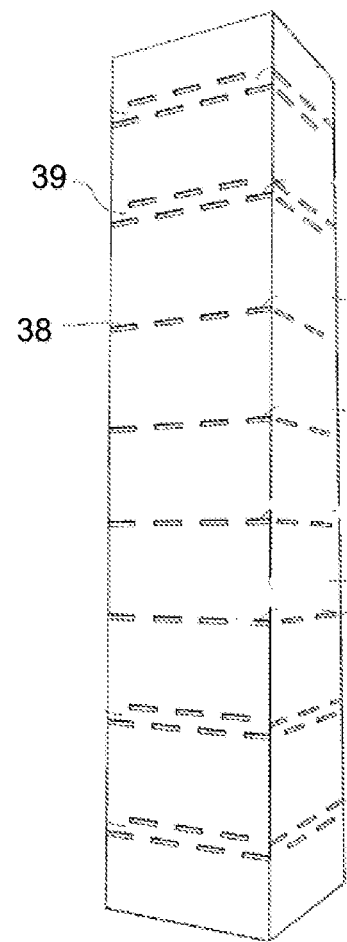

In an embodiment, referring to FIG. 3A and FIG. 3B, the invention comprises a package 30 for supporting and dispensing product pieces 36 arranged in a longitudinally stacked array. In this embodiment, the wrapper may comprise an elongate stick-like package. In this embodiment, the package may comprise a sheet 32 positioned about the stacked product pieces 36. The product pieces 36 may or may not be each individually wrapped. In some embodiments, the package may have a generally cylindrical or rectangular prism configuration. The sheet may include a plurality of longitudinally spaced weakened locations 34 extending transversely to the longitudinal direction of the package. In some embodiments, the weakened locations may be generally parallel to each and perpendicular to a longitudinal axis of the package. Each of the weakened locations may include a single weakened extent 38 or a pair of weakened extents 39 which are closely longitudinally spaced and perpendicular to the longitudinal axis. The weakened extents for each weakened location 34 may be in parallel with each other or each may have an axis or portions that are generally parallel with each other. Each weakened location 34 defines a severable location for the sheet. This wrapper configuration is more fully described in U.S. Pat. No. 9,340,351 to Conlon, et al., which is incorporated herein by reference in its entirety.

The inventive film and/or sheet described herein may be utilized in the formation of a wrapper as set forth in U.S. Pat. No. 9,340,351 to Conlon, et al. The specific layering set forth herein not only provides the barrier and dead fold properties necessary for this type of wrapper, but additionally provides a film or sheet that will lay flat during the manufacturing and wrapper formation process, without curl (or substantially without curl), and the film or sheet can be easily die cut or laser scored, as the case may be. In an embodiment, the die cuts and/or laser scoring necessary to form the wrapper set forth in U.S. Pat. No. 9,340,351 to Conlon, et al. (or any other wrapper which requires die cuts or scoring) may be cut or scored through the outer LDPE layer, the outer HDPE layer and, if present, the tie layer. The die cuts and/or scoring should not extend into the EVOH or COC barrier layer. The structure set forth herein allows for this precision scoring to be accomplished from the inside or the outside of the sheet (i.e. from the top or bottom).

In an embodiment, the inventive film, sheet, and wrapper structure provides satisfactory tear resistance, twist resistance, dead fold characteristics, barrier qualities, and seal performance. In an embodiment, the barrier qualities provide a moisture, oxygen and/or aroma barrier. In an embodiment, the dead fold characteristics of the invention provide dead fold that not only retains its shape upon initial packaging, but additionally aids in reclosing the package and/or wrapper once some product has been removed. That is, when the package is opened and some of the food product is removed, the package may be reclosed by folding or twisting the packaging. The inventive packaging material will retain or substantially retain the fold and/or twist configuration. In an embodiment, the inventive composition does not contain foil or paper and is recyclable in a polyethylene collection stream.

The films according to the present invention may be successfully employed for packaging in general and for packaging small items in particular, by wrapping with lateral and/and longitudinal twist with the aid of high speed machines. For example, films of the invention may be twisted one and a half (1½) times or five hundred and forty degrees) (540°). Once so twist wrapped, the twisted film may retain or substantially retain its twisted state and has a reduced tendency to unwrap relative to prior art polymeric films.

In an embodiment, the invention provides improved barrier properties against oxygen and moisture transmission, which are generally not pre-requisites for foldable and/or twist wrapping films because no sealing is generally involved in the packaging. However, the films of the present invention provide improved barrier properties—advantages for the shelf life of the product.

In an embodiment, the invention comprises a method for wrapping gum, candy, or other food products. In another embodiment, the invention comprises a method for making a wrapper which can be folded, twisted, or bent and retains its folded, twisted, or bent configuration after release. In yet another embodiment, the invention comprises a method for making a wrapper which has dead fold qualities. In still another embodiment, the invention comprises a method for making a wrapper which does not require use of an adhesive to reclose the wrapper. In a further embodiment, the invention comprises a method for making a wrapper which retains a food product but does not require use of a seal or adhesive to close the wrapper.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. For example, while the layers are discussed in a particular order, it should be understood that the various layers could be reordered and still remain within the scope of the invention. Therefore, the spirit and scope of the appended claims should not be limited to the description of the versions contained therein.

What is claimed is:

1. A method for making a product wrapper having dead bend characteristics, the method comprising:
   co-extruding:
      a first polyethylene layer comprising low density polyethylene;
      a second polyethylene layer affixed to the first layer, wherein the second polyethylene layer comprises high density polyethylene;
      a first tie layer affixed to the second layer, opposite the first layer;
      a barrier layer affixed to the tie layer, opposite the second layer;
      a second tie layer affixed to the barrier layer, opposite the first tie layer;
      a third polyethylene layer affixed to the second tie layer, opposite the barrier layer, wherein the third polyethylene layer comprises high density polyethylene; and
      a fourth polyethylene layer affixed to the third polyethylene layer, opposite the second tie layer, wherein the fourth polyethylene layer comprises low density polyethylene;
   wrapping the wrapper about a product; and
   closing the wrapper using only dead bend properties.

2. The method of claim 1 wherein no adhesive or seal is utilized to close the wrapper.

3. The method of claim 1 comprising twisting the wrapper about five hundred and forty degrees.

4. The method of claim 3 wherein when the wrapper is twisted about five hundred and forty degrees, the twisted wrapper substantially retains its twisted state.

5. The method of claim 1 wherein after the wrapper is opened, it is reclosed by folding or twisting the wrapper and the wrapper substantially retains the fold or twist configuration.

6. The method of claim 1 wherein the first polyethylene layer comprises the outer layer of the wrapper.

7. The method of claim 1 wherein the fourth polyethylene layer comprises the inner, food contact layer of the wrapper.

8. The method of claim 1 wherein the wrapper is used to package candy, gum, confections, cough drops, or throat lozenges.

9. The method of claim 1 wherein the wrapper is used to package a plurality of pieces of candy, gum, confections, cough drops, or throat lozenges.

10. The method of claim 1 wherein the thickness of the second layer is greater than the thickness of the first layer.

11. The method of claim 1 wherein the barrier layer comprises ethylene vinyl alcohol.

12. The method of claim 1 wherein the first tie layer and the second tie layer each comprise maleic anhydride.

13. The method of claim 1 wherein the first tie layer and the second tie layer each comprise a blend of maleic anhydride and polyethylene.

14. The method of claim 1 wherein the barrier layer comprises between about 5% and about 15% of the total thickness of the wrapper.

15. The method of claim 1 wherein the tie layers comprise between about 5% and about 15% of the total thickness of the wrapper.

16. The method of claim 1 wherein the low density polyethylene layers comprise between about 5% and about 15% of the total thickness of the wrapper.

17. The method of claim 1 wherein the high density polyethylene layers comprise between about 40% and about 70% of the total thickness of the wrapper.

18. The method of claim 1 wherein the wrapper does not contain foil or paper.

19. A method for making a product wrapper having dead bend characteristics, the method comprising:
co-extruding:
a first polyethylene layer comprising low density polyethylene;
a second polyethylene layer affixed to the first layer, wherein the second polyethylene layer comprises high density polyethylene;
a cyclic olefin copolymer layer affixed to the second layer, opposite the first layer;
a third polyethylene layer affixed to the cyclic olefin copolymer layer, opposite the second polyethylene layer, wherein the third polyethylene layer comprises high density polyethylene; and
a fourth polyethylene layer affixed to the third polyethylene layer, opposite the second tie layer, wherein the fourth polyethylene layer comprises low density polyethylene;
wrapping the wrapper about a product; and
closing the wrapper using only dead bend properties.

20. The method of claim 19 wherein no adhesive or seal is utilized to close the wrapper.

21. The method of claim 19 wherein the cyclic olefin copolymer layer comprises a barrier layer.

22. The method of claim 19 wherein the cyclic olefin copolymer layer comprises between about 5% and about 15% of the total thickness of the wrapper.

23. The method of claim 19 wherein the low density polyethylene layers comprise between about 5% and about 15% of the total thickness of the wrapper.

24. The method of claim 19 wherein the high density polyethylene layers comprise between about 40% and about 70% of the total thickness of the wrapper.

* * * * *